(12) United States Patent
Sakurai et al.

(10) Patent No.: US 9,007,026 B2
(45) Date of Patent: Apr. 14, 2015

(54) CHARGE/DISCHARGE CONTROL CIRCUIT AND BATTERY DEVICE

(75) Inventors: Atsushi Sakurai, Chiba (JP); Toshiyuki Koike, Chiba (JP); Kazuaki Sano, Chiba (JP); Fumihiko Maetani, Chiba (JP)

(73) Assignee: Seiko Instruments Inc., Chiba (JP)

( * ) Notice: Subject to any disclaimer, the term of this patent is extended or adjusted under 35 U.S.C. 154(b) by 136 days.

(21) Appl. No.: 13/208,737

(22) Filed: Aug. 12, 2011

(65) Prior Publication Data

US 2012/0056589 A1 Mar. 8, 2012

(30) Foreign Application Priority Data

Sep. 8, 2010 (JP) ................................ 2010-201123

(51) Int. Cl.
*H02J 7/00* (2006.01)
(52) U.S. Cl.
CPC ............ *H02J 7/0072* (2013.01); *H02J 7/0031* (2013.01)
(58) Field of Classification Search
CPC ......... H02J 7/0068; H02J 7/022; Y02E 60/12
USPC .......................................... 320/134, 136, 128
See application file for complete search history.

(56) References Cited

U.S. PATENT DOCUMENTS

| | | | |
|---|---|---|---|
| 7,154,291 B2 * | 12/2006 | Turner | 324/762.09 |
| 7,319,347 B2 * | 1/2008 | Cho et al. | 327/111 |
| 7,737,664 B2 * | 6/2010 | Matsunaga | 320/134 |
| 2003/0122525 A1 * | 7/2003 | Stellberger | 320/134 |
| 2005/0156573 A1 * | 7/2005 | Lin | 320/134 |
| 2006/0076931 A1 * | 4/2006 | Mandai | 320/134 |
| 2009/0085521 A1 * | 4/2009 | Kim | 320/134 |
| 2009/0121683 A1 * | 5/2009 | Goto | 320/134 |
| 2009/0212741 A1 * | 8/2009 | Ferguson | 320/134 |
| 2010/0141215 A1 * | 6/2010 | Takeda | 320/136 |
| 2010/0148727 A1 * | 6/2010 | Kwong et al. | 320/134 |
| 2011/0074356 A1 * | 3/2011 | Yamazaki et al. | 320/134 |

FOREIGN PATENT DOCUMENTS

| | | | |
|---|---|---|---|
| JP | 2000-102182 A | | 4/2000 |
| JP | 2000102182 A | * | 4/2000 |

* cited by examiner

*Primary Examiner* — Richard Isla Rodas
*Assistant Examiner* — Michael Dibenedetto
(74) *Attorney, Agent, or Firm* — Brinks Gilson & Lione

(57) ABSTRACT

Provided is a battery device including, in a charge/discharge protection circuit for controlling charge/discharge of a secondary battery by a single bidirectionally conductive field effect transistor, a charge/discharge control circuit with which the number of elements to be used is reduced to reduce the layout area. The charge/discharge control circuit includes a switch circuit for controlling a gate of the bidirectionally conductive field effect transistor based on an output of a control circuit for controlling the charge/discharge of the secondary battery, the switch circuit including a first terminal connected to a back gate of the bidirectionally conductive field effect transistor.

6 Claims, 2 Drawing Sheets

CHARGE/DISCHARGE CONTROL CIRCUIT AND BATTERY DEVICE

RELATED APPLICATIONS

This application claims priority under 35 U.S.C. §119 to Japanese Patent Application No. 2010-201123 filed on Sep. 8, 2010, the entire content of which is hereby incorporated by reference.

BACKGROUND OF THE INVENTION

1. Field of the Invention

The present invention relates to a charge/discharge control circuit for detecting a voltage and an abnormality of a secondary battery and to a battery device including the charge/discharge control circuit, and more particularly, to a charge/discharge control circuit capable of control by a single charge/discharge control MOSFET and to a battery device including the charge/discharge control circuit.

2. Description of the Related Art

FIG. 3 illustrates a circuit diagram of a battery device including a conventional charge/discharge control circuit. In the battery device including the conventional charge/discharge control circuit, an enhancement mode N-channel MOSFET 306 capable of bidirectional energization/interruption is connected in series to a negative terminal of a secondary battery 101. A charge circuit or a load is connected to terminals 120 and 121, and a charge/discharge current is supplied or discharged to or from the secondary battery 101 via the terminals 120 and 121. A control circuit 102 detects a voltage of the secondary battery 101 and a voltage of the enhancement mode N-channel MOSFET 306, and controls ON/OFF of switches 301, 304, and 305 based on the detected values. When a potential of a gate terminal of the enhancement mode N-channel MOSFET 306 is equal to or higher than a positive threshold voltage, the enhancement mode N-channel MOSFET 306 provides bidirectional energization between the drain terminal and the source terminal thereof. When the potential of the gate terminal is lower than the threshold voltage, the enhancement mode N-channel MOSFET 306 enters the OFF state between the drain terminal and the source terminal.

A charge-inhibited state is described. When a charger is connected between the terminals 120 and 121, a voltage Vds between the drain terminal and the source terminal of the enhancement mode N-channel MOSFET 306 has a positive value. The control circuit 102 detects that the voltage Vds is positive, and turns ON the switch 301 and OFF the switches 305 and 304. Accordingly, the gate terminal of the enhancement mode N-channel MOSFET 306 has a voltage higher than that of the source terminal thereof by the voltage of the secondary battery 101, with the result that the enhancement mode N-channel MOSFET 306 enters the energized state.

When the secondary battery 101 is charged and the battery voltage reaches a set upper limit value, the control circuit 102 turns OFF the switch 301 and ON the switches 305 and 304. Then, the gate terminal of the enhancement mode N-channel MOSFET 306 has the same potential as that of the source terminal thereof, with the result that the enhancement mode N-channel MOSFET 306 enters the OFF state. As a result, the charge current is interrupted to prevent overcharge of the secondary battery 101. Further, at this time, a diode 302 is reverse-biased to prevent the current from flowing through the switch 304 and the switch 305.

When the charge current is interrupted, no voltage drop by internal resistance occurs and the voltage of the secondary battery 101 reduces. In order to prevent the re-start of charge in response to the voltage reduction, after the charge is inhibited, the charge-inhibited state is maintained until the secondary battery 101 is discharged to some extent to have a voltage that is equal to or lower than a set value. Under the charge-inhibited state, if a load is connected between the terminals 120 and 121, the voltage Vds is switched from positive to negative. The control circuit 102 is thus configured to control the switches 301, 304, and 305 so that the secondary battery 101 may be discharged when the voltage Vds is negative and that the charge current may be interrupted when the voltage Vds is positive.

In the above description, the switches 304 and 305 are both turned ON at the time of the stop of charge. However, the charge can be stopped similarly even if the switch 304 is turned OFF. The first reason is that the switch 305 is ON regardless of ON/OFF of the switch 304, and hence the gate terminal of the enhancement mode N-channel MOSFET 306 has the same potential as that of the source terminal thereof and the enhancement mode N-channel MOSFET 306 thus enters the OFF state. The second reason is that the diode 302 also interrupts the current flowing through the switches 304 and 305.

Note that, the switches 304 and 305 are both OFF at the time of the charge described above and at the time of the discharge to be described later. Accordingly, if the switches 304 and 305 are both turned ON at the time of the stop of charge and the switches 304 and 305 are both turned ON also at the time of the stop of discharge as described later, the two switches are turned ON or OFF simultaneously all the time. It is therefore not necessary to control the switches 304 and 305 independently, which can simplify the configuration of the control circuit 102.

Next, a discharge-inhibited state is described. When a load is connected between the terminals 120 and 121, the voltage Vds between the drain terminal and the source terminal of the enhancement mode N-channel MOSFET 306 has a negative value. The control circuit 102 detects that the voltage Vds is negative, and turns ON the switch 301 and OFF the switches 304 and 305. Accordingly, the gate terminal of the enhancement mode N-channel MOSFET 306 has a voltage higher than that of the drain terminal thereof by the voltage of the secondary battery 101, with the result that the enhancement mode N-channel MOSFET 306 enters the energized state.

When the discharge of the secondary battery 101 progresses and the battery voltage reaches a set lower limit value, the control circuit 102 turns OFF the switch 301 and ON the switches 304 and 305. Then, the gate terminal of the enhancement mode N-channel MOSFET 306 has the same potential as that of the drain terminal thereof, with the result that the enhancement mode N-channel MOSFET 306 enters the OFF state. As a result, the discharge current is interrupted to prevent overdischarge of the secondary battery 101. Further, at this time, a diode 303 is reverse-biased to prevent the current from flowing through the switch 304 and the switch 305.

When the discharge current is interrupted, no voltage drop by internal resistance occurs and the voltage of the secondary battery 101 increases. In order to prevent the re-start of discharge in response to the voltage increase, after the discharge is inhibited, the discharge-inhibited state is maintained until the secondary battery 101 is charged to some extent to have a voltage that is equal to or higher than a set value. Under the discharge-inhibited state, if the charge circuit is connected between the terminals 120 and 121, the voltage Vds is switched from negative to positive. The control circuit 102 is thus configured to control the switches 301, 304, and 305 so that the secondary battery 101 may be charged when the voltage Vds is positive and that the discharge current may be interrupted when the voltage Vds is negative.

In the above description, the switches 304 and 305 are both turned ON at the time of the stop of discharge. However, the discharge can be stopped similarly even if the switch 305 is turned OFF. The first reason is that the switch 304 is ON regardless of ON/OFF of the switch 305, and hence the gate terminal of the enhancement mode N-channel MOSFET 306 has the same potential as that of the drain terminal thereof and the enhancement mode N-channel MOSFET 306 thus enters the OFF state. The second reason is that the diode 303 also interrupts the current flowing through the switches 305 and 304.

Note that, if the switches 304 and 305 are both turned ON at the time of the stop of discharge, as described above, the two switches are turned ON or OFF simultaneously all the time. It is therefore not necessary to control the switches 304 and 305 independently, which can simplify the configuration of the control circuit 102.

The enhancement mode N-channel MOSFET 306 has built-in diodes 321 and 322 formed therein. However, the diodes 321 and 322 are connected in series in opposite directions and hence are not electrically connected to each other, which has no influence on the protection operation described above.

The enhancement mode N-channel MOSFET 306 may be of either a lateral structure or a vertical structure. In the case of the lateral structure, it is easy to form the enhancement mode N-channel MOSFET 306 and the control circuit 102 as a single IC. Therefore, the reduction in size and cost can be achieved because the overcharge/overdischarge protection circuit, which has heretofore been formed by a single IC and two switches, can be formed by a single IC. On the other hand, in the case of the vertical structure, the reduction in loss can be achieved as compared to the lateral structure (see, for example, Japanese Patent Application Laid-open No. 2000-102182 (FIG. 9)).

The conventional technology, however, has a problem that the number of elements is large and the layout area is large.

SUMMARY OF THE INVENTION

The present invention has been made in order to solve the above-mentioned problem, and provides a charge/discharge control circuit capable of reducing the layout area, and also provides a battery device including the charge/discharge control circuit.

In order to solve the conventional problem, a battery device including a charge/discharge control circuit according to the present invention has the following configuration.

The present invention provides a charge/discharge control circuit for controlling charge/discharge of a secondary battery by a single bidirectionally conductive field effect transistor, the charge/discharge control circuit including: a control circuit connected to both ends of the secondary battery, for monitoring a voltage of the secondary battery; and a switch circuit including a first terminal and a second terminal, for controlling a gate of the bidirectionally conductive field effect transistor based on an output of the control circuit, in which the first terminal is connected to a back gate of the bidirectionally conductive field effect transistor.

According to the battery device including the charge/discharge control circuit of the present invention, the number of elements to be used can be reduced to reduce the layout area.

DETAILED DESCRIPTION OF THE PREFERRED EMBODIMENTS

Referring to the accompanying drawings, embodiments of the present invention are described below.

[First Embodiment]

Figure 1:
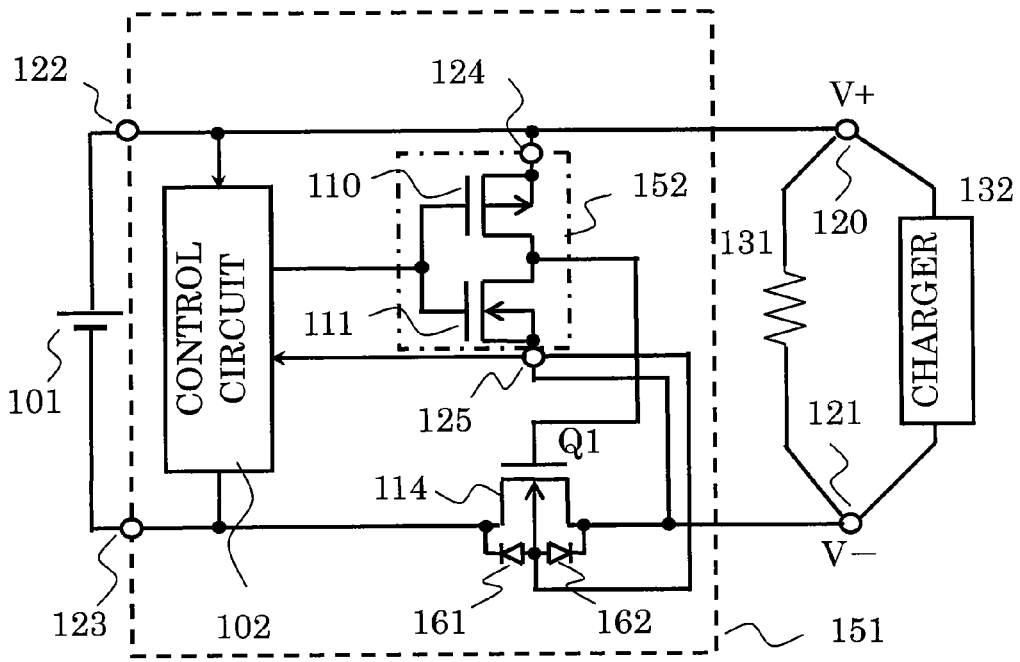
FIG. 1 is a circuit diagram of a battery device including a charge/discharge control circuit according to a first embodiment of the present invention.

FIG. 1 is a circuit diagram of a battery device including a charge/discharge control circuit 151 according to a first embodiment of the present invention.

The battery device including the charge/discharge control circuit 151 of this embodiment includes a secondary battery 101, a control circuit 102, a bidirectionally conductive field effect transistor 114, external terminals 120 and 121 between which a charger 132 or a load 131 is to be connected, a PMOS transistor 110, and an NMOS transistor 111. The PMOS transistor 110, the NMOS transistor 111, a terminal 124 (second terminal), and a terminal 125 (first terminal) together form a switch circuit 152.

The secondary battery 101 has both ends connected to a positive power supply terminal 122 and a negative power supply terminal 123, respectively. The control circuit 102 is connected to the positive power supply terminal 122 as positive power supply and to the terminal 125 as negative power supply. The control circuit 102 has an output connected to a gate of the PMOS transistor 110 and a gate of the NMOS transistor 111. The PMOS transistor 110 has a source connected to the positive power supply terminal 122 and the external terminal 120 via the terminal 124, and a drain connected to a drain of the NMOS transistor 111. The NMOS transistor 111 has a source and a back gate which are connected to a back gate of the bidirectionally conductive field effect transistor 114 via the terminal 125. The NMOS transistor 111 has the drain also connected to a gate of the bidirectionally conductive field effect transistor 114. The bidirectionally conductive field effect transistor 114 has a drain connected to the negative power supply terminal 123 and a source connected to the external terminal 121.

Next, an operation of the battery device including the charge/discharge control circuit 151 according to this embodiment is described.

When the charger 132 is connected between the external terminals 120 and 121 and the control circuit 102 detects that the secondary battery 101 is in a chargeable/dischargeable state, the control circuit 102 outputs Low to turn ON the PMOS transistor 110 and OFF the NMOS transistor 111. Then, the gate electrode of the bidirectionally conductive field effect transistor 114 is connected to the positive power supply terminal 122, and the bidirectionally conductive field effect transistor 114 enters an ON state. This way, charge/discharge is performed. Here, the negative power supply of the control circuit 102 is connected to the terminal 125, and hence a lower one of the voltage at the negative power supply terminal 123 and the voltage at the external terminal 121 can be output as Low.

When the charger 132 is connected between the external terminals 120 and 121 and the control circuit 102 detects that the secondary battery 101 has entered a charge-inhibited state, the control circuit 102 outputs High to turn OFF the PMOS transistor 110 and ON the NMOS transistor 111. Then, the gate of the bidirectionally conductive field effect transistor 114 is pulled down to the external terminal 121 via a parasitic diode 162, the terminal 125, and the NMOS transistor 111. The bidirectionally conductive field effect transistor 114 then enters the OFF state. This way, a charge current is interrupted to prevent overcharge of the secondary battery 101.

When the load 131 is connected between the external terminals 120 and 121 and the control circuit 102 detects that the secondary battery 101 has entered a discharge-inhibited state, the control circuit 102 outputs High to turn OFF the PMOS transistor 110 and ON the NMOS transistor 111. Then, the gate of the bidirectionally conductive field effect transistor 114 is pulled down to the negative power supply terminal 123 via a parasitic diode 161, the terminal 125, and the NMOS transistor 111. The bidirectionally conductive field effect transistor 114 then enters the OFF state. This way, a discharge current is interrupted to prevent overdischarge of the secondary battery 101.

Note that, the bidirectionally conductive field effect transistor 114 may be externally connected to the charge/discharge control circuit 151.

As described above, according to the battery device including the charge/discharge control circuit 151 of this embodiment, by the configuration with a small number of elements to be used, the charge current can be interrupted when the secondary battery 101 enters the charge-inhibited state and the discharge current can be interrupted when the secondary battery 101 enters the discharge-inhibited state.

[Second Embodiment]

Figure 2:
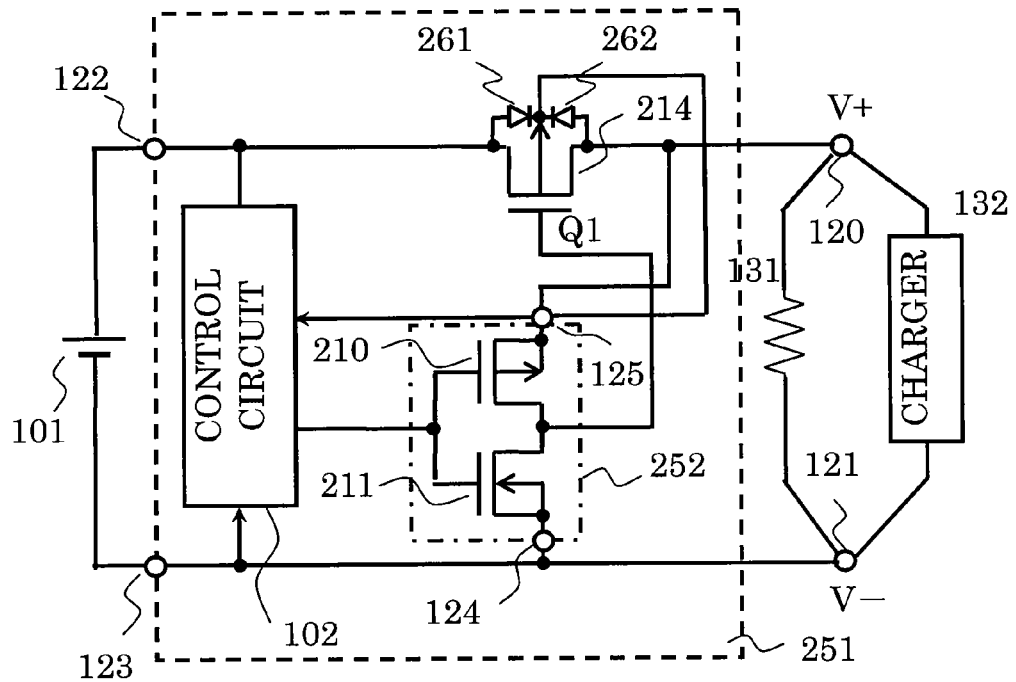
FIG. 2 is a circuit diagram of a battery device including a charge/discharge control circuit according to a second embodiment of the present invention.
Figure 3:
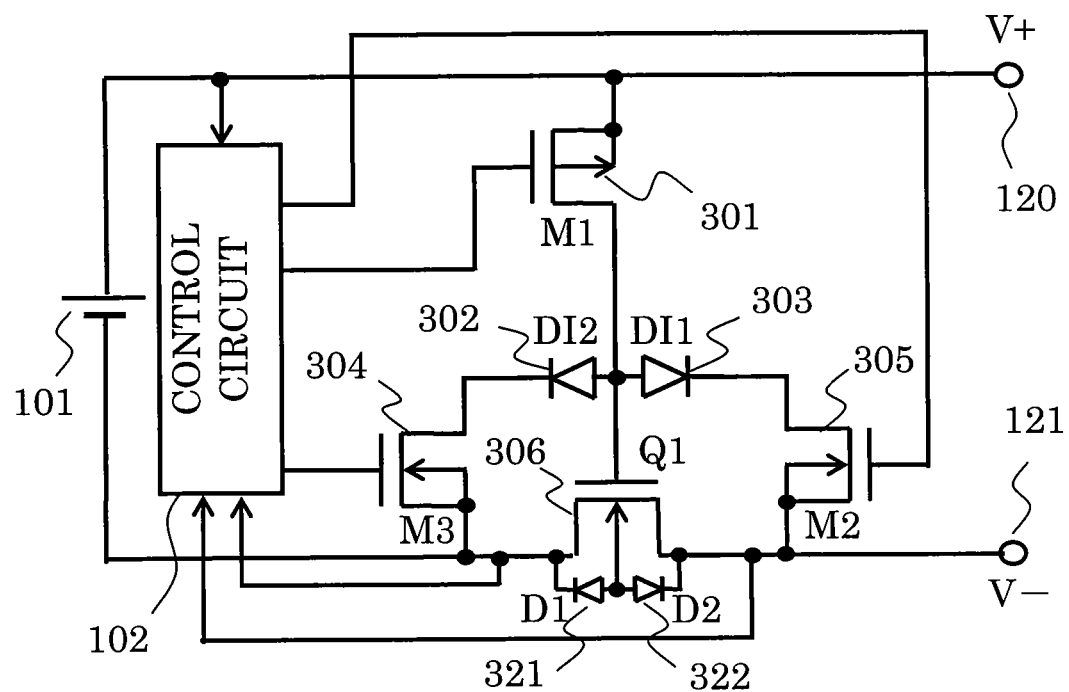
FIG. 3 is a circuit diagram of a battery device including a conventional charge/discharge control circuit.

FIG. 2 is a circuit diagram of a battery device including a charge/discharge control circuit 251 according to a second embodiment of the present invention.

The battery device including the charge/discharge control circuit 251 of the second embodiment includes a secondary battery 101, a control circuit 102, a bidirectionally conductive field effect transistor 214, external terminals 120 and 121 between which a charger 132 or a load 131 is to be connected, a PMOS transistor 210, and an NMOS transistor 211. The PMOS transistor 210, the NMOS transistor 211, a terminal 124 (second terminal), and a terminal 125 (first terminal) together form a switch circuit 252.

The secondary battery 101 has both ends connected to a positive power supply terminal 122 and a negative power supply terminal 123, respectively. The control circuit 102 is connected to the terminal 125 as positive power supply and to the negative power supply terminal 123 as negative power supply. The control circuit 102 has an output connected to a gate of the PMOS transistor 210 and a gate of the NMOS transistor 211. The PMOS transistor 210 has a source and a back gate which are connected to a back gate of the bidirectionally conductive field effect transistor 214 via the terminal 125. The PMOS transistor 210 has a drain connected to a drain of the NMOS transistor 211. The NMOS transistor 211 has a source connected to the negative power supply terminal 123 and the external terminal 121 via the terminal 124. The NMOS transistor 211 has the drain also connected to a gate of the bidirectionally conductive field effect transistor 214. The bidirectionally conductive field effect transistor 214 has a drain connected to the positive power supply terminal 122 and a source connected to the external terminal 120.

Next, an operation of the battery device including the charge/discharge control circuit 251 according to the second embodiment is described.

When the charger 132 is connected between the external terminals 120 and 121 and the control circuit 102 detects that the secondary battery 101 is in a chargeable/dischargeable state, the control circuit 102 outputs High to turn OFF the PMOS transistor 210 and ON the NMOS transistor 211. Then, the gate electrode of the bidirectionally conductive field effect transistor 214 is connected to the negative power supply terminal 123, and the bidirectionally conductive field effect transistor 114 enters an ON state. This way, charge/discharge is performed. Here, the positive power supply of the control circuit 102 is connected to the terminal 125, and hence a higher one of the voltage at the positive power supply terminal 122 and the voltage at the external terminal 120 can be output as High.

When the charger 132 is connected between the external terminals 120 and 121 and the control circuit 102 detects that the secondary battery 101 has entered a charge-inhibited state, the control circuit 102 outputs Low to turn ON the PMOS transistor 210 and OFF the NMOS transistor 211. Then, the gate of the bidirectionally conductive field effect transistor 214 is pulled up to the external terminal 120 via a parasitic diode 262, the terminal 125, and the PMOS transistor 210. The bidirectionally conductive field effect transistor 214 then enters the OFF state. This way, a charge current is interrupted to prevent overcharge of the secondary battery 101.

When the load 131 is connected between the external terminals 120 and 121 and the control circuit 102 detects that the secondary battery 101 has entered a discharge inhibited state, the control circuit 102 outputs Low to turn ON the PMOS transistor 210 and OFF the NMOS transistor 211. Then, the gate of the bidirectionally conductive field effect transistor 214 is pulled up to the positive power supply terminal 122 via a parasitic diode 261, the terminal 125, and the PMOS transistor 210. The bidirectionally conductive field effect transistor 214 then enters the OFF state. This way, a discharge current is interrupted to prevent overdischarge of the secondary battery 101.

Note that, the bidirectionally conductive field effect transistor 214 may be externally connected to the charge/discharge control circuit 251.

As described above, according to the battery device including the charge/discharge control circuit 251 of the second embodiment, by the configuration with a small number of elements to be used, the charge current can be interrupted when the secondary battery 101 enters the charge-inhibited state and the discharge current can be interrupted when the secondary battery 101 enters the discharge-inhibited state.

What is claimed is:

1. A charge/discharge control circuit for controlling charge/discharge of a secondary battery by a single bidirectionally conductive field effect transistor, the charge/discharge control circuit comprising:

a control circuit connected to both ends of the secondary battery, for monitoring a voltage of the secondary battery; and a switch circuit comprising a P-channel MOS transistor and an N-channel MOS transistor, wherein a common gate is connected to an output of the control circuit and a common drain is directly connected to a gate electrode of the bidirectionally conductive field effect transistor, the switch circuit further including a first terminal and a second terminal, both connected to the control circuit, wherein the first terminal is directly connected to a back gate of the bidirectionally conductive field effect transistor, a source of the N-channel MOS transistor is connected to the first terminal, and a source of the P-channel MOS transistor is connected to the second terminal, such that the switch circuit controls the gate electrode and the back gate of the bidirectionally conductive field effect transistor based on an output signal of the control circuit.

2. A charge/discharge control circuit according to claim 1, wherein the control circuit includes a negative power supply terminal connected to the first terminal.

3. A battery device, comprising:
a chargeable/dischargeable secondary battery;
a single bidirectionally conductive field effect transistor serving as a charge/discharge control switch, which is provided in a charge/discharge path of the chargeable/dischargeable secondary battery; and
the charge/discharge control circuit according to claim 1, for monitoring a voltage of the chargeable/dischargeable secondary battery to open/close the charge/discharge control switch, to thereby control charge/discharge of the chargeable/dischargeable secondary battery.

4. A charge/discharge control circuit, for controlling charge/discharge of a secondary battery by a single bidirectionally conductive field effect transistor, the charge/discharge control circuit comprising:
a control circuit connected to both ends of the secondary battery, for monitoring a voltage of the secondary battery; and
a switch circuit comprising a P-channel MOS transistor and an N-channel MOS transistor,
wherein a common gate is connected to an output of the control circuit and a common drain is directly connected to a gate electrode of the bidirectionally conductive field effect transistor,
the switch circuit further including a first terminal and a second terminal, both connected to the control,
wherein the first terminal is directly connected to a back gate of the bidirectionally conductive field effect transistor, and a source of the P-channel MOS transistor is connected to the first terminal, and a source of the N-channel MOS transistor is connected to the second terminal, such that the switch controls the gate electrode and the back gate of the bidirectionally conductive field effect transistor based on an output signal of the control circuit.

5. A charge/discharge control circuit according to claim 4, wherein the control circuit includes a positive power supply terminal connected to the first terminal.

6. A battery device, comprising:
a chargeable/dischargeable secondary battery;
a single bidirectionally conductive field effect transistor serving as a charge/discharge control switch, which is provided in a charge/discharge path of the chargeable/dischargeable secondary battery; and
the charge/discharge control circuit according to claim 4, for monitoring a voltage of the chargeable/dischargeable secondary battery to open/close the charge/discharge control switch, to thereby control charge/discharge of the chargeable/dischargeable secondary battery.

* * * * *

UNITED STATES PATENT AND TRADEMARK OFFICE
CERTIFICATE OF CORRECTION

| | | |
|---|---|---|
| PATENT NO. | : 9,007,026 B2 | Page 1 of 1 |
| APPLICATION NO. | : 13/208737 | |
| DATED | : April 14, 2015 | |
| INVENTOR(S) | : Atsushi Sakurai et al. | |

It is certified that error appears in the above-identified patent and that said Letters Patent is hereby corrected as shown below:

In the Claims

In column 8, claim 4, line 6, after "connected to the" replace "control," with --control circuit,--.

Signed and Sealed this
Twenty-fourth Day of November, 2015

Michelle K. Lee
*Director of the United States Patent and Trademark Office*